US012198701B2

(12) United States Patent
Saito et al.

(10) Patent No.: US 12,198,701 B2
(45) Date of Patent: Jan. 14, 2025

(54) SUPPORT METHOD AND COMPUTER READABLE STORAGE MEDIUM

(71) Applicant: Konica Minolta, Inc., Tokyo (JP)

(72) Inventors: Keita Saito, Settsu (JP); Aran Suzuki, Tokyo (JP); Masaharu Harashima, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 499 days.

(21) Appl. No.: 17/358,336

(22) Filed: Jun. 25, 2021

(65) Prior Publication Data
US 2022/0013128 A1 Jan. 13, 2022

(30) Foreign Application Priority Data

Jul. 10, 2020 (JP) .................... 2020-118844

(51) Int. Cl.
G10L 15/30 (2013.01)
G10L 15/02 (2006.01)
G10L 15/26 (2006.01)
G10L 25/78 (2013.01)
(52) U.S. Cl.
CPC .......... G10L 15/30 (2013.01); G10L 15/02 (2013.01); G10L 15/26 (2013.01); G10L 25/78 (2013.01)
(58) Field of Classification Search
CPC .......... G10L 15/30; G10L 15/02; G10L 15/26
See application file for complete search history.

(56) References Cited

U.S. PATENT DOCUMENTS

2018/0124247 A1* 5/2018 Zhao .................. G10L 17/00
2018/0286389 A1* 10/2018 Kawachi ............. G10L 15/22

FOREIGN PATENT DOCUMENTS

| JP | 2018-101368 A | 6/2018 |
| JP | 2018-173752 A | 11/2018 |
| JP | 2018-174442 A | 11/2018 |
| JP | 2019-061594 A | 4/2019 |

OTHER PUBLICATIONS

Office Action dated Dec. 5, 2023, for corresponding Japanese Patent Application No. 2020-118844, with English translation.

* cited by examiner

Primary Examiner — Ibrahim Siddo
(74) Attorney, Agent, or Firm — LUCAS & MERCANTI, LLP

(57) ABSTRACT

A conversation support system is provided at an utterance place where utterance is delivered to a plurality of persons. The persons are each an utterer having a possibility of uttering and/or a performer having a possibility of marking. The conversation support system includes a hardware processor and a marking motion catcher. The hardware processor obtains voice data of an utterance made by an utterer and received by a voice receiver, and manages the voice data on a voice timeline. The marking motion catcher catches a marking motion by which a marker is given to the utterance. The hardware processor manages the marking motion on a marking timeline, and links the marking motion with the utterance on a same timeline.

28 Claims, 4 Drawing Sheets

FIG.5

| INDEX | DATETIME | USERNAME | MARKER | LINK | TALK |
|---|---|---|---|---|---|
| ... | ... | ... | ... | ... | ... |
| 246 | 16:20:07 | A | | | REAL-TIME SENSE TOO |
| 247 | 16:20:12 | A | ★ | | NOTE UPDATE IS SMOOTH |
| 248 | 16:20:17 | A | | | IT'S GREAT |
| 249 | 16:20:24 | A | ☆ | MUCH NOISE | SMOOTHNESS IS QUITE IMPORTANT |
| 250 | 16:20:26 | B | | | AGREE |
| 251 | 16:20:44 | B | | | AM I THE ONLY ONE WHO CAN SEE THIS? |
| 252 | 16:20:45 | A | ★ | | STAR MARK? |
| 253 | 16:20:48 | B | | | YES |
| ... | ... | ... | ... | ... | ... |

SUPPORT METHOD AND COMPUTER READABLE STORAGE MEDIUM

CROSS-REFERENCE TO RELATED APPLICATIONS

The entire disclosure of Japanese Patent Application No. 2020418844 filed on Jul. 10, 2020 is incorporated herein by reference in its entirety.

BACKGROUND

Technological Field

The present disclosure relates to a conversation support system, a conversation support method and a computer readable storage medium.

Description of the Related Art

At a meeting, brainstorming or the like, participants are required to concentrate on discussions, and, unlike a traditional conference or the like, it has been often difficult for participants to participate in such a place/occasion while taking notes about important points or the like.

As a method for enabling participants to concentrate on discussions and put important points on record, there is, for example, a method of recording utterances made at a place of conversations, and later reproducing these for participants to listen to and summarize important points. However, this method requires participants to take much time and effort.

In this regard, for example, in JP 2018-174442 A, there is proposed a conference support system including: an operation unit to set the content of an utterance as an important comment; and an important comment notifying unit to notify the other terminals of information indicating that the content is important. The conversation support system further includes a unit to select an utterance when it is an important utterance. The conversation support system converts utterances into texts and thereafter displays an important utterance(s) with a marker(s) given thereto on a display unit of a terminal.

Selection of an important utterance is performed by an utterer pressing a predetermined button and specifying a range of an important utterance when the utterer is about to make the important utterance, or by the utterer marking a text of an important utterance displayed on a display unit. By doing so, the utterer lets an audience recognize which utterance is important.

SUMMARY

However, when, in particular, a participant who is not the utterer marks an important utterance, he/she needs to perform an operation for marking while gazing steadily at the text(s) displayed on the display unit.

This hinders participants from concentrating on discussions.

Objects of the present disclosure include providing a conversation support system, a conversation support method and a computer readable storage medium storing a program each of which enables participants to concentrate on discussions and put important points on record, without requiring the participants to take either time or effort.

In order to achieve at least one of the above mentioned objects, according to a first aspect of the present disclosure, there is provided a conversation support system provided at an utterance place where utterance is delivered to a plurality of persons each being an utterer having a possibility of uttering and/or a performer having a possibility of marking, including:
 a hardware processor that:
  obtains voice data of an utterance made by an utterer and received by a voice receiver; and
  manages the voice data on a voice timeline; and
 a marking motion catcher that catches a marking motion by which a marker is given to the utterance, wherein
 the hardware processor:
  manages the marking motion on a marking timeline; and
  links the marking motion with the utterance on a same timeline.

In order to achieve at least one of the abovementioned objects, according to a second aspect of the present disclosure, there is provided a conversation support method used at an utterance place where utterance is delivered to a plurality of persons each being an utterer having a possibility of uttering and/or a performer having a possibility of marking, including:
 obtaining voice data of an utterance made by an utterer and received by a voice receiver;
 managing the voice data on a voice timeline;
 catching a marking motion by which a marker is given to the utterance;
 managing the marking motion on a marking timeline; and
 linking the marking motion with the utterance on a same timeline.

In order to achieve at least one of the abovementioned objects, according to a third aspect of the present disclosure, there is provided a non-transitory computer readable storage medium storing a program that causes a computer of a conversation support system provided at an utterance place where utterance is delivered to a plurality of persons each being an utterer having a possibility of uttering and/or a performer having a possibility of marking to:
 obtain voice data of an utterance made by an utterer and received by a voice receiver;
 manage the voice data on a voice timeline;
 catch a marking motion by which a marker is given to the utterance;
 manage the marking motion on a marking timeline; and
 link the marking motion with the utterance on a same timeline.

BRIEF DESCRIPTION OF THE DRAWINGS

The advantages and features provided by one or more embodiments of the present disclosure will become more fully understood from the detailed description given hereinbelow and the appended drawings that are given by way of illustration only, and thus are not intended as a definition of the limits of the present disclosure, wherein:

FIG. 5 shows an example of display on a display according to the embodiment.

DETAILED DESCRIPTION OF THE EMBODIMENTS

Hereinafter, one or more embodiments of a conversation support system, a conversation support method and a computer readable storage medium storing a program according to the present disclosure will be described with reference to FIG. 1 to FIG. 5.

Although a variety of limitations that are technically favorable for carrying out the present invention are put on the following embodiment(s), the technical scope of the present invention is not limited to the following embodiment(s) or illustrated examples.

Overall Configuration of Conversation Support System

Figure 1:
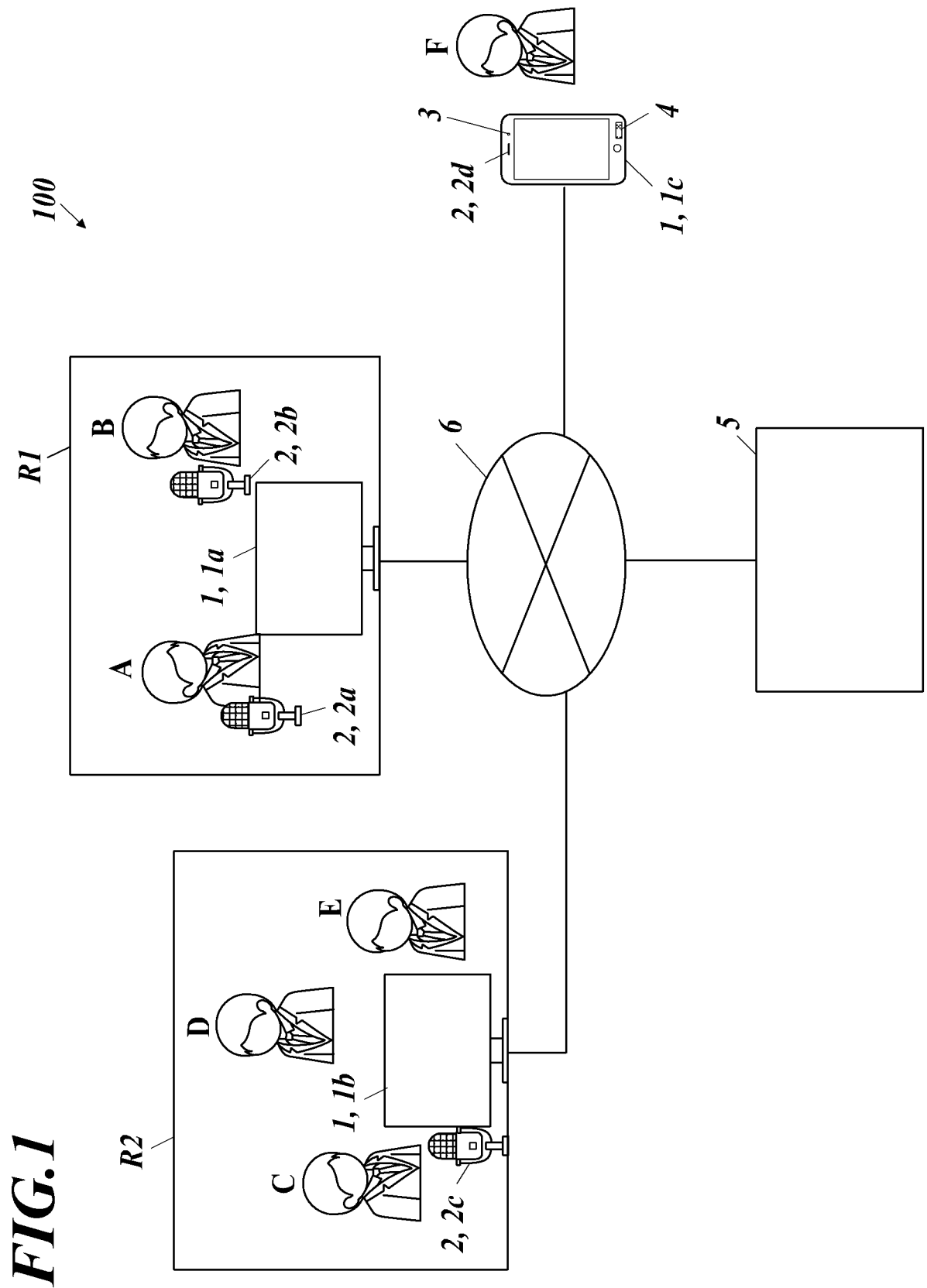
FIG. 1 is a block diagram schematically showing overall configuration of a conversation support system according to an embodiment(s)

First, an outline of configuration of a conversation support system 100 according to an embodiment(s) will be described. FIG. 1 is a block diagram schematically showing overall configuration of the conversation support system 100.

The conversation support system 100 is provided at an utterance place where utterance is delivered to a plurality of persons.

The conversation support system 100 of this embodiment is expected to be provided, for example, as shown in FIG. 1, at an utterance place in which two participants A, B in a conference room R1, three participants C, D, E in a conference room R2 and one participant F at home or in an open space of his/her destination or the like participate.

The conversation support system 100 of this embodiment is expected to be provided at a wide range of places/occasions where persons exchange their opinions or the like, such as a conference, a meeting, and a place of brainstorming.

Although not all of the participants A to F may utter (speak), they are each an "utterer" having a possibility of uttering. In this embodiment, there is a plurality of utterers each having a possibility of uttering.

Regardless of whether they utter, the participants A to F are each a "performer" having a possibility of marking (performing marking motions) to give markers to his/her own utterances (talks) or the other utterers' utterances.

In an example shown in FIG. 1, in the conference room R1, one terminal device 1 (1a) and two microphones 2 as voice receivers are provided.

The microphones 2 provided in the conference room R1 are provided for the respective participants A, B. That is, a microphone 2a is provided for the participant A, and a microphone 2b is provided for the participant B.

In the conference room R2, one terminal device 1 (1b) and one microphone 2 (2c) are provided. That is, in the conference room R2, one microphone 2c is provided for the participants C, D, E.

The terminal devices 1 (1a, 1b) provided in the conference rooms R1, R2 are stationary/desktop personal computers (hereinafter referred to as "PC(s)"), laptop PCs, tablet PCs or the like.

The participant F has a portable terminal device (terminal device 1c), such as a smartphone, and participates in the utterance place through the terminal device 1c.

The terminal device 1c includes a microphone 2 (2d) as a voice receiver, a camera 3 as an imager described below, and a loudspeaker 4 as a voice outputter.

The terminal devices 1a, 1b, which are stationary/desktop PCs, laptop PCs, tablet PCs or the like, may each be provided with a microphone 2, a camera 3, a loudspeaker 4 and/or the like that may be built in each terminal device 1 or may be external components attached to each terminal device 1.

In this embodiment, tile terminal devices 1 (1a, 1b, 1c) are connected to a server 5 via a communication network 6.

The communication network 6 may be Internet or another network, such as a LAN (Local Area Network). The terminal devices 1 (1a, 1b, 1c) may be connected to the server 5 with cables.

Configuration of Terminal Device

Next, configuration of the terminal device(s) 1 of the conversation support system 100 according to this embodiment will be described with reference to FIG. 2.

Figure 2:
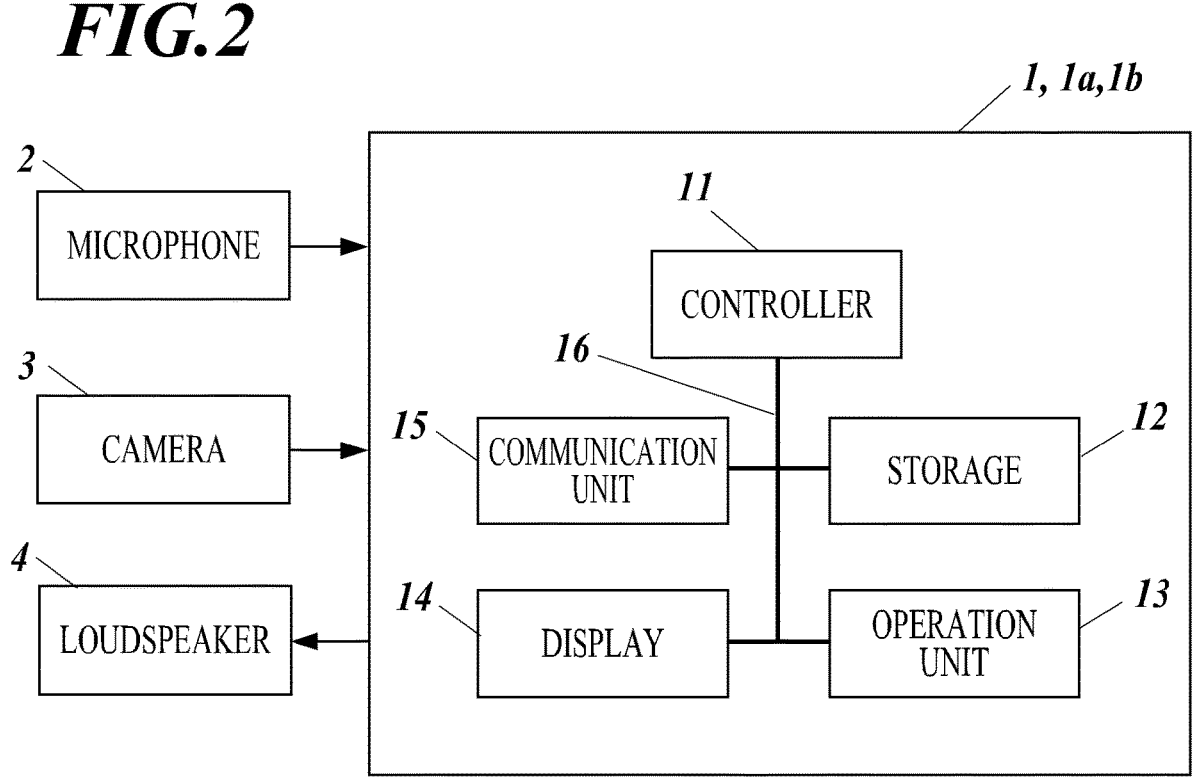
FIG. 2 is a block diagram showing configuration of the main part of a terminal device of the conversation support system.

FIG. 2 is a block diagram showing configuration of the main part of the terminal device 1 (1a/1b).

The terminal device 1c is, as described above, a portable terminal device, such as a smartphone, but not limited thereto, and hence may be a laptop PC, a tablet PC or the like having built-in microphone 2, camera 3, loudspeaker 4 and/or the like.

The terminal device 1c is different from the terminal device in having built-in microphone 2, camera 3 and loudspeaker 4 shown in FIG. 2. Except this, the terminal device 1c is the same as the terminal device 1a/1b in configuration. Hence, hereinafter, the terminal device 1a/1b is described, and description of the terminal device 1c is omitted.

As shown in FIG. 2, the terminal device 1a/1b includes a controller 11, a storage 12, an operation unit 13, a display 14, a communication unit 15 and a bus 16 that connects these components 11 to 15 with one another. To the terminal device 1a/1b, a microphone(s) 2 as a voice receiver(s), a camera(s) 3 as an imager(s), a loudspeaker(s) 4 as a voice outputter(s) and or the like are connected.

The controller 11 includes a CPU (Central Processing Unit) and a RAM (Random Access Memory). In response to operations on/off the operation unit 13, the CPU of the controller 11 reads various programs stored in the storage 12, loads the read programs into the RAM, and performs various processes in accordance with the loaded programs, thereby performing concentrated control of operation of each component of the terminal device 1.

The storage 12 is configured by a nonvolatile semiconductor memory, a hard disk and/or the like, and has a program storage region (not shown) where, for example, various programs to be executed by the controller 11 and parameters necessary to perform processes of the programs are stored, and a data storage region (not shown) where, for example, various data are stored.

In the data storage region of the storage 12, the following data are stored: voice data of utterances received by the microphone 2 as a voice receiver, text data into which the voice data have been converted: image data of images of gestures performed by a performer(s) and caught by the camera 3 as an imager; and other data. In this embodiment, voice data of each utterance is stored in the storage 12 in association with identification information identifying the utterer of the utterance, and image data of each gesture is stored in the storage 12 in association with identification information identifying the performer of the gesture.

The operation unit 13 includes: a keyboard including cursor keys, number input keys and various function keys; and a pointing device, such as a mouse, and outputs, to the controller 11 instruction signals input by operations on/with the keys of the keyboard or the mouse. The operation unit 13 may include an operation button, such as a push button. Additionally or alternatively, an operation device (not shown) configured separately from the terminal device 1 and including an operation button or the like may be provided in the conversation support system 100. In this case, this operation device also functions as the operation unit 13.

The operation unit 13 may have a touchscreen on the display screen of the display 14. In this case, the operation unit 13 outputs, to the controller 11, instruction signals input via the touchscreen.

In this embodiment, voice data are converted into texts (text data), and the texts are displayed on the display 14. When the touchscreen is laid on the display screen of the display 14, marking motions may each be performed by selecting a character string (text) corresponding to an utterance from a list displayed on the display screen. The character string may be selected by a key operation or an operation button operation, for example. In this case, the operation unit 13 functions as a marking motion catcher with which a performers) inputs/performs marking motions and which catches/obtains information thereof.

The display 14 is configured by a monitor, such as an LCD (Liquid Crystal Display) or a CRT (Cathode Ray Tube), and displays instructions input from the operation unit 13, data and/or the like in accordance with instructions of display signals input from the controller 11.

In this embodiment, the display 14 can display data in which voice data of utterances of participants and marking motions of the participants are associated (linked) with one another on the same timeline.

That is, in this embodiment, as described below, voice data are converted into text data of character strings, and the character strings are displayed in the form of a list on the display 14, and these text data of the voice data and markers are associated with one another and displayed as the list as shown in FIG. 5.

On the display screen of the display 14, as described above, the touchscreen, which functions as the operation unit 13, may be laid.

The communication unit 15 includes a LAN adapter, a modem and/or a TA (Terminal Adapter) to control data sending/receiving to/from the devices or the like that are connected to the communication network 6.

The microphone 2 connected to the terminal device 1 of this embodiment records a voice when an utterer utters.

In this embodiment, when a performer performs a marking motion by voice, the microphone 2 records this voice too, and thereby functions as a marking motion catcher.

The microphone 2 constitutes a voice receiver together with an amplifier (not shown), an A/D converter (not shown) and/or the like, and converts voice data input as analog signals into digital data as needed. The voice data recorded by the microphone 2 and converted into the digital data are sent to the controller 11.

In this embodiment, voice data are sent from the terminal device 1 to the server 5, and obtained by a controller 51 described below.

The microphone 2 may be fixedly provided (installed) in the conference room R1/R2 or may be portable. The microphone 2 may be used by being attached to the terminal device 1. When there are two or more utterers (participants) each having a possibility of uttering, it is preferable that two or more microphones 2 be provided in the conversation support system 1, and it is further preferable that microphones 2 be provided for the respective utterers (participants).

The camera 3 is an imager that images gestures of persons.

When a participant performs a marking motion, which is described below, by gesture, the camera 3 catches the gesture, and thereby functions as a marking motion catcher.

The camera 3 may be fixedly provided (installed) in the conference room R1/R2, or may be portable. The camera 3 may be used by being attached to the terminal device 1.

When there are two or more performers each having a possibility of marking, it is preferable that two or more cameras 3 be provided in the conversation support system 100, and it is further preferable that cameras 3 be provided for the respective performers.

When cameras 3 are provided for the respective performers, image data of images taken by the cameras 3 are associated with information (identification information, such as names or identification numbers) of the respective performers for whom the respective cameras 3 are provided. More specifically, preset identification information is attached to image data of each taken image. This makes it possible to obtain marking motions in association with their respective performers. That is, it is possible to identify, from image data of each taken image, the performer of each marking motion.

Data (image data of taken images) obtained by the camera 3 of the terminal device 1 are sent to the controller 11 thereof. In this embodiment, image data are sent from the terminal device 1 to the server 5, and obtained by the controller 51 described below.

The loudspeaker 4 reproduces and outputs, for example, voice data of utterances made by an utterer(s).

The loudspeaker 4 constitutes a voice outputter together with a D/A converter (not shown), an amplifier (not shown) ail nor the like.

Connecting the loudspeakers 4 to the terminal devices I that are provided in conference rooms or the like at locations away from one another enables participants in the conference rooms or the like to participate in the utterance place, listen to the content of each utterance made by any participant, and have conversations with one another.

Configuration of Server

Next, configuration of the server 5 of the conversation support system 100 according to this embodiment will be described with reference to FIG. 3.

The server 5 processes various data sent from the terminal devices 1 (1a, 1b, 1c) and sends the processing results to the terminal devices 1 (1a, 1b, 1c). This enables the participants A to F participating in the utterance place through the terminal devices 1 (1a, 1b, 1c) to have the same information.

Figure 3:
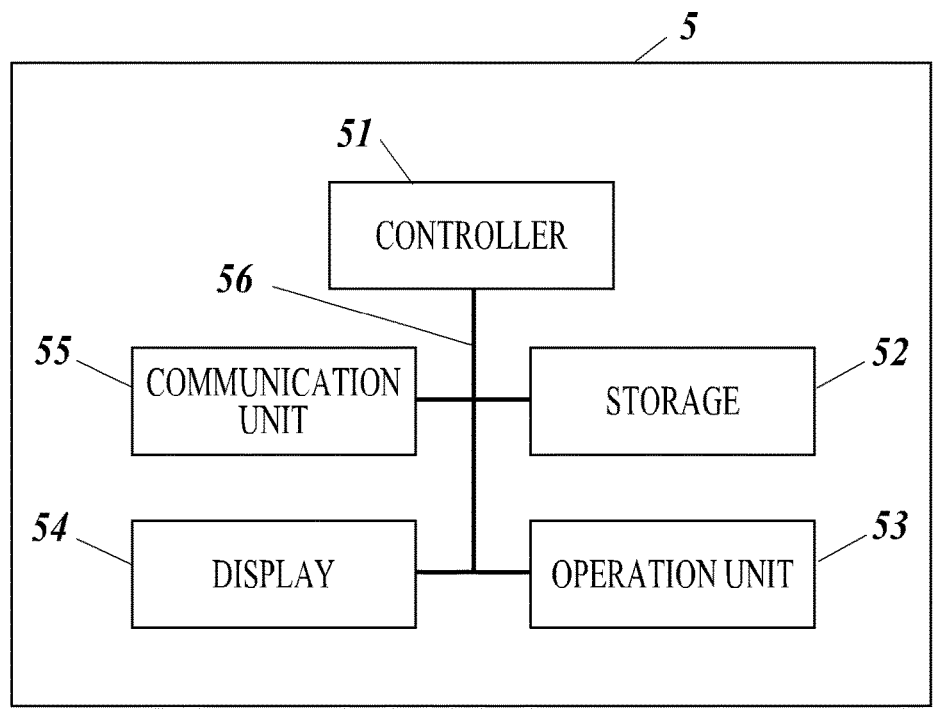
FIG. 3 is a block diagram showing configuration of the main part of a server of the conversation support system.

FIG. 3 is a block diagram showing configuration of the main part of the server 5.

As shown in FIG. 3, the server 5 includes a controller 51 (hardware processor), a storage 52, an operation unit 53, a display 54, a communication unit 55 and a bus 56 that connects these components 51 to 55 with one another.

The controller 51 includes a CPU (Central Processing Unit) and a RAM (Random Access Memory). In response to operations on/with the operation unit 53, the CPU of the controller 51 reads various programs stored in the storage 52, loads the read programs into the RAM, and performs various processes in accordance with the loaded programs, thereby performing concentrated control of operation of each component of the server 5.

In this embodiment, the controller 51 functions as a voice obtaining unit, an utterer identification unit, a voice timeline creation unit, a marking analysis unit, a marking timeline creation unit, a conversion-into-text unit, a data linkage unit and/or the like.

The controller 51 (voice obtaining unit) obtains voice data of utterances made by utterers (participants A to F) and received by the microphones 2 as voice receivers. In this embodiment, voice data of utterances received by the microphones 2 of the respective terminal devices 1 are obtained by the controllers 11 of the respective terminal devices 1. The voice data obtained by the controllers 11 are sent from the respective terminal devices 1 to the server 5 via the communication units 15, 55, and obtained by the controller 51 of the server 5.

Further, the controller 51 (utterer identification unit) identifies the utterer (one of participants A to F) of each obtained utterance (voice data). That is, as in the case shown in FIG. 1, when there are two or more utterers, the controller 51 identifies who has made which utterance (talk). Association of each utterance with the utterer of the utterance is stored in the storage 52 or the like.

The method for the controller 51 to identify the utterer of each utterance is not particularly limited.

For example, as in the conference room R1 shown in FIG. 1, when the microphones 2 are provided for the respective utterers (participants A, B), the controller 51 identifies the utterer of each utterance by obtaining correspondence between the microphones 2 and the utterers (participants A, B) for whom the respective microphones 2 are provided. For example, in advance, individual identification (ID) numbers or the like are given to the respective microphones 2, and the microphone 2a having an ID number of 001 and the microphone 2b laving an ID number of 002 are registered to be used by the participant A and the participant B, respectively. This makes it possible to, when an utterance is made and received by a microphone 2, attach, to voice data of the utterance, information indicating whether the microphone 2 that has received the utterance is the microphone 2a having an ID number of 001 or the microphone 2b having an ID number of 002. Identifying the utterer of each utterance on the basis of the information attached to voice data of the utterance makes it possible to easily identify who has made the utterance.

Alternatively, for example, the controller 51 may identify the utterer of each utterance by comparing a voice waveform of the utterance received by a microphones 2 with each of voice waveforms unique to the respective utterers. For example, in advance, voice waveforms of the respective utterers (participants C, D, F) are associated with the identification information (e.g. ID numbers) of the respective utterers. This makes it possible to, when an utterance is made and received by a microphone 2, compare the voice waveform of the utterance with each of the voice waveforms of the utterers (participants C, D, E). This configuration makes it possible to identify the utterer of each utterance even when, as in the conference room R2 shown in FIG. 1, one microphone 2 is provided for a plurality of utterers (participants C, D, F).

Further, the controller 51 (voice timeline creation unit) manages each obtained voice data on a voice timeline. That is, to voice data of each utterance, time data of time at which the utterance was made is attached. The controller 51 arranges voice data of utterances in chronological order on the basis of their respective time data.

Further, the controller 51 (marking analysis unit) analyzes each marking motion by which a marker is given to an utterance, when the marking motion is caught.

The "marker" is a mark or a sign that is given to an utterance when a person who has listened to or made the talk (utterance) (i) judges the talk important, (ii) pays special attention to the talk, or (iii) is interested in the talk, for example.

When a participant performs a predetermined marking motion for an utterance, the controller 51 stores the marking motion in the storage 52 together with time data of the performed time of the marking motion.

Markers each indicating a plurality of meanings (performer's intentions), such as "important", "valuable", "caution" and "question", may be given by the same type of marking motion. Alternatively, markers indicating different meanings may be associated with different types of marking motions so that why each marker has been given can be understood. In this case, the controller 51 analyzes each marking motion to obtain its meaning, attaches information on the performer's intention to the marking motion, and stores these in the storage 52 or the like, for example.

In this embodiment, as marking motions, for example, voice input, gesture input, and input with an operation means are assumed.

When marking motions are performed by voice, the microphone(s) 2 is the marking motion catcher, when marking motions are performed by gesture, the camera(s) 3 is the marking motion catcher, and when marking motions are performed by operating an operation means, the operation unit(s) 13 or the like is the marking motion catcher.

Information caught by the microphone 2, the camera 3 and the operation unit 13 is not only marking motions. Hence, the controller 51 analyzes each motion to determine whether the motion is a marking motion.

For example, in the case of voice input, utterances (voices) as marking motions, such as "nice" and "mark", are registered in advance, and when a caught utterance (voice) corresponds to one of these, the controller 51 determines that the utterance is not a mere utterance but a marking motion.

As another example, in the case of gesture input, gestures as marking motions, such as a gesture of right hand thumbs-up and a gesture of left hand waving, are registered in advance, and when a caught gesture corresponds to one of these, the controller 51 determines that the gesture is not a mere motion but a marking motion.

In this embodiment, multiple types of marking motions are prepared for, on the voice timeline, the position of each utterance to Which a marker is given.

That is, in this embodiment, there are prepared at least a first marking motion by which a marker is given at the uttered timing of an utterance (i.e. by which a marker is given to an utterance made at the performed timing of the marking motion) and a second marking motion by which a marker is given to an utterance made at a predetermined timing before the performed timing of the marking motion.

For example, in the case of voice input, when a voice of "mark" is caught, the controller 51 determines that the caught voice is the first marking motion by which a marker is given at the uttered timing of an utterance, whereas when a voice of "three mark" is caught, the controller 51 determines that the caught voice is the second marking motion by which a marker is given to an utterance made three seconds earlier than the performed timing of the marking motion.

As another example, in the case of gesture input, when a gesture of one-time left hand waving is caught, the controller 51 determines that the caught gesture is the first marking motion by winch a marker is given at the uttered timing of an utterance, whereas when a gesture of one-time right hand waving is caught, the controller 51 determines that the caught gesture is the second marking motion by which a marker is given to an utterance one utterance before an utterance made at the performed timing of the marking motion.

As another example, in the case of input with an operation means (operation button), the position, on the voice timeline, of an utterance to which a marker is given may be selected on the basis of at least one of: the number of times the operation button has been operated; the length of time for which the operation button has been operated; and the strength of the operation applied to the operation button.

Thus, the second marking motion may be a marking motion by which a marker is given to an utterance (talk) in the past, the utterance being specified by time; for example, a marking motion by which a marker is given to an utterance made some seconds earlier than the performed timing of the marking motion. Alternatively, the second marking motion may be a marking motion by which a marker is given to an utterance (talk) in the past, the utterance being specified by going back to the past in units of utterances (talks); for example, a marking motion by which a marker is given to an utterance made some utterance(s) earlier than the performed timing of the marking motion.

Thus, the controller 51 analyzes the content of each marking motion to obtain its meaning.

Correspondence between marking motions and their respective meanings is preset and stored/registered in the storage 52 or the like, and the controller 51 analyzes each marking motion on the basis of the stored information. Rules of analysis of marking motions may be customized by each performer and registered.

Further, the controller 51 (marking timeline creation unit) manages each caught marking motion on a marking timeline.

As described above, when the first marking motion, by which a marker is given at the uttered timing of an utterance, and the second marking motion, by which a marker is given to an utterance made at a predetermined timing before the performed timing of the marking motion, are prepared, the controller 51 gives each marker to a position on the marking timeline, which follows the predetermined rules, on the basis of the above-described analysis result.

Further, the controller 51 (data linkage unit) links utterances with marking motions on the same timeline.

When, as described above, the controller 51 gives each marker to a position on the marking timeline, which follows the predetermined rules, the controller 51 reflects this created marking timeline in linking utterances with marking motions.

Further, in this embodiment, on the display 14, text data of utterances (character strings of text data into which voice data of utterances have been converted) and markers given to tile utterances are displayed. When notes, comments or the like are written on the display 14, the controller 51 links these with utterances and marking motions on the same timeline.

Further, when image data of images taken at the utterance place are present, the controller 51 also links these with utterances and marking motions on the same timeline.

Further, the controller 51 (conversion-into-text unit) converts each obtained voice data into text data.

More specifically, a dictionary database (not shown) or the like for converting utterances into texts (text data) is stored in the storage 52 or the like, and the controller 51 converts voice data of each utterance into text data, referring to the stored information. Voice data of fillers, such as "like", "uh", "well", "umm" and "hmm", may be excluded from the target of conversion into text data.

In this embodiment, the controller 51 punctuates and converts voice data of each utterance talk by talk into text data. More specifically, the controller 51 converts a range of voice data of an utterance determined as one talk (first talk) into text data (one text data), and when determining that the following forms another talk, separates it from the first talk. Thus, in the case where voice data of an utterance is divided into talks, text data thereof are displayed at different lines on the display 14 by line feed.

The method for the controller 51 to punctuate voice data of an utterance talk by talk is not particularly limited. For example, the controller 51 may punctuate voice data of an utterance talk by talk in response to detecting a silent state or detecting context.

That is, when determining that the silent state has continued for a predetermined time, or determining that the context has changed, the controller 51 determines, referring to the dictionary database or the like, that another talk starts, and separates it from the previous talk (first talk).

When the silent state is detected to determine whether an utterance is one talk, a silent-state continuing time (threshold), by which whether an utterance is one talk is determined, is preset. For example, when the silent state continues for two or more seconds, the controller 51 determines that another talk starts.

The storage 52 is configured by a nonvolatile semiconductor memory, a hard disk and/or the like, and has a program storage region (not shown) where, for example, various programs to be executed by the controller 51 and parameters necessary to perform processes of the programs are stored, and a data storage region (not shown) where, for example, various data are stored. In the program storage region of this embodiment, a program for conversation support is stored, for example.

In the data storage region of the storage 52, the following data are stored: voice data of utterances received by the microphones 2 as voice receivers, text data into which the voice data have been converted; image data of images of gestures performed by performers and caught by the cameras 3 as imagers; and other data. In this embodiment, voice data of each utterance is stored in the storage 52 in association with identification information identifying the utterer of the utterance, and image data of each gesture is stored in the storage 52 in association with identification information identifying the performer of the gesture.

The operation unit 53 includes: a keyboard including cursor keys, number input keys and various function keys; and a pointing device, such as a mouse, and outputs, to the controller 51, instruction signals input by operations on/with the keys of the keyboard or the mouse. The configuration of the operation unit 53 is not limited thereto. When various operation buttons are provided, and/or a touchscreen is laid on the display 54, these also function as the operation unit 53.

The display 54 is configured by a monitor, such as an LCD (Liquid Crystal Display) or a CRT (Cathode Ray Tube), and displays instructions input from the operation unit 53, data and/or the like in accordance with instructions of display signals input front the controller 51.

The communication unit 55 includes a LAN adapter, a modem and/or a TA (Terminal Adapter) to control data sending/receiving to/from the devices or the like that are connected to the communication network 6.

Operation of Conversation Support System

Next, a conversation support method realized by the conversation support system 100 according to this embodiment will be described with reference to FIG. 4 and FIG. 5.

Figure 4:
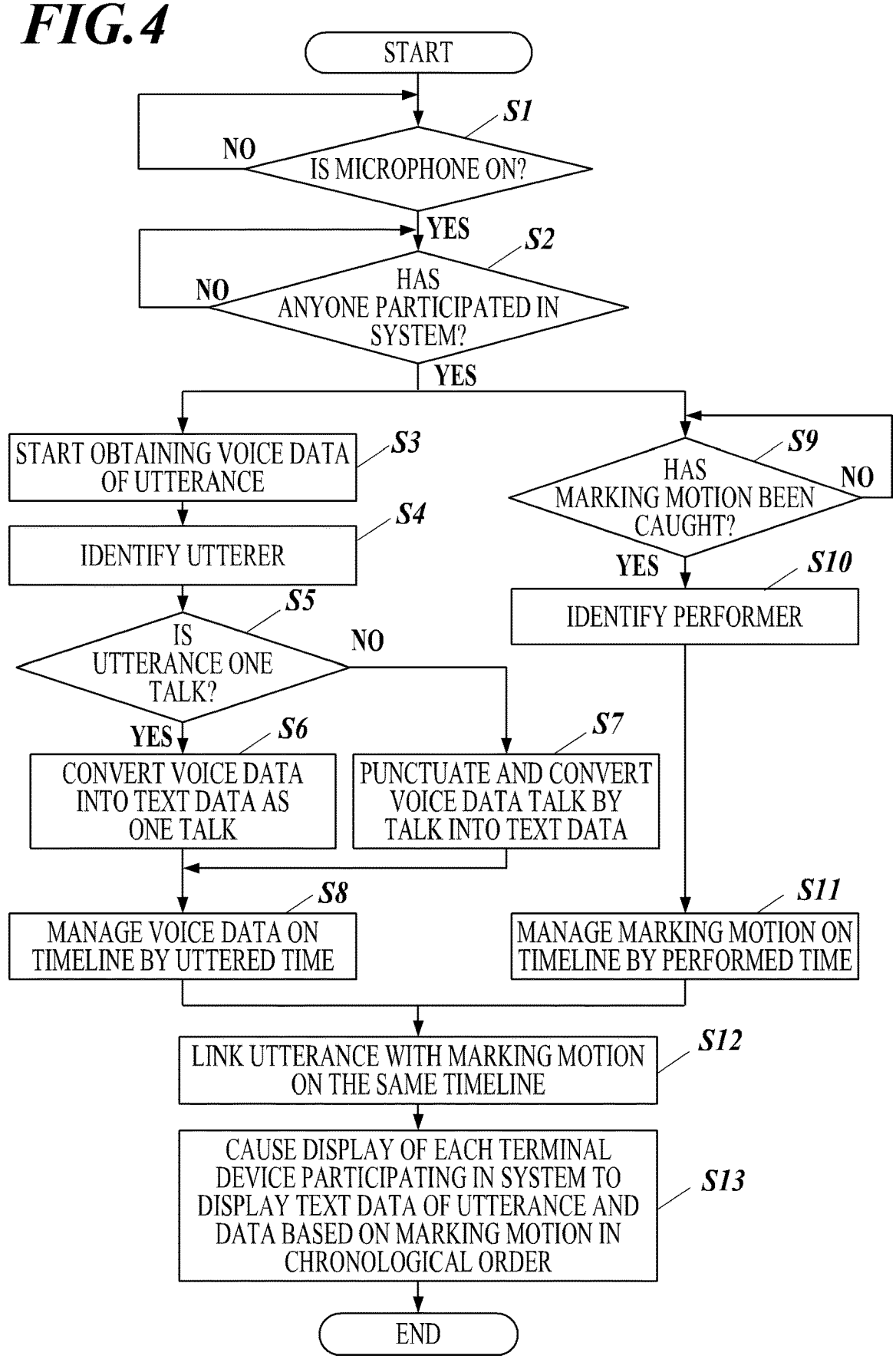
FIG. 4 is a flowchart of a conversation support method according to the embodiment.

FIG. 4 is a flowchart of the conversation support method according to this embodiment.

As shown in FIG. 4, when conversation support is performed by the conversation support system 100, the controller 51 determines whether a microphone(s) 2 provided in the conversation support system 100 has been powered (i.e. is ON) (Step S1). When no microphone 2 has been powered (Step S1; NO), the controller 51 repeats Step 1 until a microphone(s) 2 is powered.

When a microphone(s) 2 has been powered (Step S1; YES), the controller 51 determines whether anyone (terminal devices 1) has participated in the conversation support system 100 (Step S2). More specifically, the controller 51 determines whether person(s) (participant(s)) have expressed their participations in a conference, a meeting or the like by performing input operations representing the participations, such as logins. When no one has participated in the conversation support system 100 (Step S2, NO), the controller 51 repeats S2 until person(s) participate in tile conversation support system 100.

When person(s) have participated in the conversation support system 100 (Step S2; YES), the controller 51 starts obtaining voice data of utterances received by the microphones 2 provided in the conversation support system 100 (e.g. when the microphones 2a, 2b, 2c, 2d have participated in the conversation support system 100, alt of these microphones 2) (Step S3).

When voice data of an utterance is obtained, the controller 51 identifies the utterer of the utterance (Step S4).

The controller 51 also determines whether the utterance is one talk (Step S5). If the controller 51 determines that the utterance is one talk (Step S5; YES), the controller 51 converts the voice data into text data as one talk (Step S6). If the controller 51 determines that the utterance is not one talk (Step S5; NO), the controller 51 punctuates and converts the voice data talk by talk into text data (Step S7).

The controller 51 manages voice data of each utterance on the voice timeline (i.e. in chronological order) by its uttered time on the basis of time data or the like attached to the voice data (Step S8).

Once person(s) have participated in the conversation support system 100 (Step S2, YES), the controller 51 determines at all times whether any marking motion has been caught for any utterance (Step S9) in parallel with the obtainment of voice data of utterances.

The controller 51 repeats Step S9 until determining that a marking motion leas been caught, and when determining that a marking motion has been caught (Step S9, YES), identifies the performer of the marking motion (Step S10). When multiple types of marking motions having different meanings are prepared (registered in the storage 52 or the like), the controller 51 analyzes the caught marking motion to obtain its meaning.

When identification of the performer of the marking motion and analysis of the marking motion finish, the controller 51 proceeds to Step S11. The controller 51 manages each marking motion on the marking timeline (i.e. in chronological order) by its performed time (Step S11), When, as described above, the marking motion has been analyzed for an utterance made a predetermined time earlier than the performed time of the marking motion due to predetermined rules, the marking motion is arranged at a position on the marking timeline in accordance with the rules.

When utterances and marking motions are arranged on their timelines, the controller 51 links the utterances with the marking motions on the same timeline (Step S12).

Then, the coworker 51 causes the display 14 of each terminal device 1 participating in the conversation support system 100 to display the text data of the utterances and marker data based on the marking motions in chronological order (Step S13). More specifically, the controller 51 generates display data for displaying a list where the text data of the utterances and the marker data based on the marking motions are arranged in chronological order, and sends the generated display data to each terminal device 1, and the controller 11 of each terminal device 1 controls display of the display 14 on the basis of the display data, and thereby causes the display 14 to display the list as shown in FIG. 5 on its display screen.

FIG. 5 shows an example of an output that is output during or after use of the conversation support system 100 of this embodiment. The output shown in FIG. 5 may be displayed, for example, on the display 14 of each terminal device 1, or may be printed out.

In FIG. 5, in an item of "INDEX", sequential numbers of utterances (talks) are shown, in an item of "DATETIME", uttered times of utterances (talks) are shown, in an item of "USERNAME", login names (which may be real names or pseudonyms used in the conversation support system 100) of participants are shown, in an item of "MARKER", markers (marking log/history) given by participants, by performing marking motions, to talks that they think important or the like are shown, in an item of "LINK", notes or the like linked with talks are shown, and in an item of "TALK", texts of talks (utterances) are shown.

In FIG. 5, in the items of "USERNAME" and "MARKER" of the participant A, emphasis is not placed (as markers, white stars are used), whereas in the items of "USERNAME", "MARKER" and "LINK" of the participant B, boldface is used (as markers, black stars are used). This distinction makes it easy to visually recognize Who has put a mark or left a note on which talk. In FIG. 5, for the sake of convenience of illustration, the distinction is made by boldface. When the output is actually displayed on the display 14 or printed out, it is preferable that different colors be used for different participants (i.e. color coding be performed), for example.

Further, in FIG. 5, the distinction is made in the items of "USERNAME", "MARKER" and "LINK" by the same method, namely by boldface (by color coding or the like), but the distinction may be made in other items too, such as the item of "TALK", by the same method. However, since talks in the item of "TALK" and names of utterers in the item of "USERNAME" are displayed at the same points of time (on the same lines), the distinction in the item of "TALK" by color coding or the like is dispensable. Further, if it is important to know to winch talk many markers have been given, distinction of performers by color coding or the like may be unnecessary.

The method for distinguishing markers by performer of marking is not limited to the method of displaying markers in colors set for the respective performers. For example, following the respective markers, names (login names, etc.)

of performers may be displayed. As another example, cartoon character marks or the like set for the respective performers may be displayed. For example, a cartoon drawing of a cat is displayed as markers given by marking motions performed by the participant A, and a cartoon drawing of a flower is displayed as markers given by marking motions performed by the participant B.

In FIG. 5, only star-shaped markers are shown in the item of "MARKER". However, as described above, when multiple types of markers indicating different meanings are prepared, markers of different shapes may be displayed as these different types of markers. For example, when a performer thinks of an utterance (talk) as an important point, a star-shaped marker may be displayed as a marker for "important", whereas when a performer has a question about an utterance (talk), a triangular marker may be displayed as a marker for "question".

In the item of "LINK", for example, notes (texts) entered by participants into the terminal devices 1 are shown. FIG. 5 shows a note made by the participant B talk having an index of "249" and uttered by the participant A. When a participant enters a note or the like and thereafter selects a talk desired to be linked with, the note can be linked with the talk.

In the item of "LINK", not only notes but also image data of taken images or the like may be linked with desired talks. In this case, for example, an icon indicating that image data is linked with a talk, a linked address (URL) and/or the like may be displayed in the item of "LINK".

Further, data for output (display data or printing data) as shown in FIG. 5, which is generated by the server 5 and sent to each terminal device 1 participating, in the conversation support system 100, may be stored in the storage 12 or the like of each terminal device 1. However, in terms of degree of freedom in use of each terminal device 1 and data management cost, it is preferable that the data for output be stored in the storage 52 or the like of the server 5 so as to be readable by each terminal device 1 as needed.

Thus, the conversation support system 100 of this embodiment enables participants to put important points or the like on record as needed by giving markers or the like thereto while concentrating on discussions and uttering, without requiring the participants to take either time or effort.

Advantageous Effects

As described above, the conversation support system 100 according to this embodiment is a conversation support system provided at an utterance place where utterance is delivered to a plurality of persons each being an utterer having a possibility of uttering and/or a performer having a possibility of marking, wherein the controller 51 obtains voice data of each utterance made by an utterer and received by a microphone 2 as a voice receiver, and manages the voice data on a voice timeline, and when a marking motion by which a marker is given to the utterance is caught, manages the marking motion on a marking timeline, and links the marking motion with the utterance on the same timeline.

This enables participants to, while concentrating on discussions, conversations or the like, give markers to utterances (talks) appropriately when they think the utterances (talks) important or the like. Regarding to which utterance (talk) each marker is given, the system side (in this embodiment, the controller 51 of the server 5) automatically associates these with one another.

Thus, participants do not need to first record conversations and later create text data thereof and search for important talks from a list displayed. That is, participants can both concentrate on discussions and put important points on record without taking time or effort.

Further, in this embodiment, a plurality of utterers each having a possibility of uttering are present, and a plurality of microphones 2 as voice receivers are provided in the conversation support system 100.

This enables smooth utterance even when a plurality of persons participate in the conversation support system 100 and utter simultaneously.

Further, the controller 51 identifies tile utterer of each utterance.

This makes it possible to identify who has made each utterance (talk) even when a plurality of persons participate in the conversation support system 100.

In particular, when a plurality of microphones 2 as voice receivers are respectively provided for a plurality of utterers, the controller 51 can identify the utterer of each utterance by obtaining a correspondence between the microphones 2 and the utterers.

This makes it possible to automatically identify the utterer of each utterance without, before uttering, the utterer entering or declaring that he/she is about to utter, and hence enables smooth progress of conversations at a conference or the like.

Alternatively, the controller 51 may identify the utterer of each utterance by comparing the voice waveform of the utterance received by a microphone 2 with each of the voice waveforms unique to the respective utterers. This makes it possible to identify the utterer of each utterance (talk) accurately even when microphones 2 are not provided for the respective utterers.

Further, microphones 2 may each be portable. This enables participants to participate in the conversation support system 100 from anywhere, and improves degree of freedom in use of the conversation support system 100.

Further, in this embodiment, the controller 51 converts voice data of each utterance into text data.

This makes it possible to easily create a book of minutes or the like without requiring participants to transcribe recorded utterances as text data.

Further, in this embodiment, the controller 51 punctuates and converts voice data of each utterance talk by talk into text data.

This makes it possible to generate text data that are easy to read, so that the content of a conference of conversations can be checked later.

Further, the controller 51 punctuates voice data of each utterance talk by talk in response to detecting the silent state or detecting the context.

This makes it possible to punctuate voice data of each utterance talk by talk at appropriate points.

Further, in this embodiment, a plurality of performers having a possibility of marking are present, and a plurality of marking motion catchers, such as cameras 3, are provided in the conversation support system 100.

This makes it possible to catch marking motions appropriately even when a plurality of persons judge the content of utterances.

In particular, when a plurality of marking motion catchers, such as cameras 3, are respectively provided for a plurality of performers, and marking motions are obtained in association with their respective performers, it is easy to know who has paid special attention to which utterance (talk), for example.

Marking motions may each be performed by voice. In this case, a microphone(s) 2 as a voice receiver(s) serves as a marking motion catcher(s).

This enables participants to perform marking motions smoothly without being away from microphones 2 that are used for uttering.

Marking motions may each be performed by gesture, in this case, a camera(s) 3 as an imager(s) serves as a marking motion catcher(s).

This enables participants to perform marking motions easily even while uttering by performing gestures, without interrupting conversations or the like.

Marking motions may each be performed by selecting a character string corresponding to an utterance from a list of character strings of text data into which voice data of utterances have been converted, the list being displayed on the display 14 of each terminal device 1. This enables participants to easily give, to utterances (talks), markers for which the participants have forgotten to perform marking motions, while checking the display screen of the display 14.

Marking motions may each be an input operation (man operation button of each terminal device 1 provided in the conversation support system 100, or an operation button of an operation device or the like provided separately from the terminal device 1.

This enables participants to perform marking motions by operating a button(s).

Multiple types of marking motion catchers described above may be provided in the conversation support system 100. This enables participants to select how to perform marking motions according to the scene, and hence perform marking motions more freely.

In this embodiment, when notes, comments or the like are written on the display screen or the like of the display 14 of each terminal device 1, the controller 51 links the written notes or the like with utterances and marking motions on the same timeline.

This makes it possible to easily associate and put on record utterances with what participants come up with or are aware of in the middle of conversations or the like.

Further, when images are taken at the utterance place, the controller 51 links image data of the taken images with utterances and marking motions on the same timeline.

This makes it possible to easily associate and put on record utterances with image data of taken images even when characters or the like written as notes on a board or the like are imaged.

Further, in this embodiment, multiple types of marking motions may be prepared for, on the voice timeline, positions of utterances to which markers are given.

For example, the multiple types of marking motions may include a first marking motion by which a marker is given at the uttered timing of an utterance and a second marking motion by which a marker is given to an utterance made at a predetermined timing before the performed timing of the marking motion.

This enables participants to appropriately give markers to utterances to which they desire to give markers, even when they could not perform marking motions promptly at the uttered timings of the utterances.

For example, when marking motions are each performed by operating an operation button, the position, on the voice timeline, of an utterance to which a marker is given may be selected on the basis of at least one of the number of times the operation button has been operated, the length of time for which the operation button has been operated, and the strength of the operation applied to the operation button.

This makes it possible to relatively easily and accurately select an utterance (talk) to which a marker is given.

Further, in this embodiment, the controller 51 links identification information identifying the performer of each marking motion with the marking motion.

This makes it possible to know who has paid special attention to which utterance (talk), for example.

In particular, when text data of utterances and markers given to the utterances are displayed, and also the identification information identifying the performer of each marking motion by which a marker has been given is displayed, it is easy to know who has paid special attention to which utterance (talk), for example.

Further, when, as the identification information, names of performers Of colors set for the respective performers are displayed, it is possible to visually and intuitively recognize and accordingly easily know who has paid special attention to which utterance (talk), for example.

Further, in this embodiment, the conversation support system 100 includes the server 5 that stores voice data (and text data) of utterances, information on marking motions, information on the voice timeline, and information on the marking timeline.

This ensures a sufficient storage capacity regardless of performance and configuration of each terminal device 1, and makes it possible to construct the conversation support system 100 that is more stable.

Modifications

In the above, an embodiment of the present disclosure has been described. It is needless to say, however, that the present invention is not limited to the embodiment, and can be modified in a variety of aspects within a range not departing from the scope of the present invention.

For example, in the above embodiment, as shown in FIG. 1, the conversation support system 100 is applied to the case where the participants A to F are present in the conference rooms R1, R2 and so forth, and bounce ideas off one another and utter. However, the conversation support system 100 is applicable to not only such a case but others.

For example, the conversation support system 100 is applicable to the case where only one person utters (speaks), such as the place of a speech.

In this case, although there is only one utterer (speaker) who delivers a speech, an audience who listens to the speech can participate in the place, namely in the conversation support system 100, as performers who perform marking motions as needed by which markers are given to the content of the speech. In addition, the speaker who delivers the speech may also perform marking motions as needed by which markers are given to his/her own utterances.

Thus, even in the case where only one person utters, such as the place of a speech, the conversation support system 100 records, at all times, which talk the audience has valued and to which talk how the audience has reacted, without hindering the progress of the speech.

The conversation support system 100 does not need to have the server 5.

When the conversation support system 100 does not have the server 5, the controller 11 (hardware processor) of a terminal device 1 functions as the voice obtaining unit, the voice timeline creation unit, the marking analysis unit, the marking timeline creation unit, the data linkage unit, the utterer identification unit, the conversion-into-text unit and/or the like.

For example, when one terminal device 1 is provided in the conversation support system 100, and participants participate in the utterance place from a conference room where the terminal device 1 is provided and/or from a place(s) where a microphone(s) 2, a camera(s) 3, a loudspeaker(s) 4 and/or the like connected to the terminal device 1 are provided, various data obtained/caught by all the microphones 2, the cameras 3 and so forth provided in the conversation support system 100 are sent to the controller 11 of the terminal device 1, and the controller 11 performs various processes.

As another example, when two or more terminal devices 1 are provided in the conversation support system 100, one of the terminal devices 1 serves as a host. Various data input to the other terminal devices 1 are all sent to this host terminal device 1, and the controller 11 of the host terminal device 1 functions as the voice obtaining unit, the voice timeline creation unit, the marking analysis unit, the marking timeline creation unit, the data linkage unit, the utterer identification unit, the conversion-into-text unit and/or the like.

In this case, the processing results of the controller 11 of the host terminal device 1 are sent to all the other terminal devices 1 in the conversation support system 100 to be shared. In this case, the terminal devices 1 may be connected to one another via the communication network 6, such as Internet or a LAN, or with cables.

Further, the configuration of the conversation support system 100 is not limited to the one in which one controller functions as all the voice obtaining unit, the voice timeline creation unit, the marking analysis unit, the marking timeline creation unit, the data linkage unit, the utterer identification unit, the conversion-into-text unit and/or the like.

For example, the controller 11 of a terminal device 1 and the controller 51 of the server 5 may divide the roles therebetween and perform various processes.

Not making the controller 51 perform all the processes increases expectation of improvement in processing speed, and division of the roles between the terminal device 1 and the server 5 can reduce the load of the controller 11, the storage 12 and/or the like of the terminal device 1, so that the conversation support system 100 can operate smoothly.

Further, the detailed configuration and detailed operation of each component of the conversation support system 100 can be appropriately modified within a range not departing from the scope of the present invention.

Although one or more embodiments or the like of the present disclosure have been described and illustrated in detail, the disclosed embodiments or the like are made for purposes of not limitation but illustration and example only. The scope of the present invention should be interpreted by terms of the appended claims.

What is claimed is:

1. A conversation support system provided at an utterance place where utterance is delivered to a plurality of persons each being an utterer having a possibility of uttering and/or a performer having a possibility of marking, comprising:
    a hardware processor that:
        obtains voice data of a conversation including at least one utterance made by one of more utterer and received by a voice receiver during the conversation; and
        manages the voice data on a voice timeline; and
    a marking motion catcher that catches a marking motion during the conversation by which a marker is given while the hardware processor continues to obtain the voice data of the conversation, wherein the hardware processor:
        manages the marking motion on a marking timeline; and
        links the marking motion with a linked utterance of the at least one utterance on a same timeline,
    wherein the marking motion catcher catches the marking motion before determining the linked utterance to which the marking motion is linked.

2. The conversation support system according to claim 1, wherein
    a plurality of utterers each having a possibility of uttering are present, and
    the conversation support system further comprises, as the voice receiver, a plurality of voice receivers.

3. The conversation support system according to claim 1, wherein the hardware processor identifies the utterer of the at least one utterance.

4. The conversation support system according to claim 3, further comprising, as the voice receiver, a plurality of voice receivers respectively provided for a plurality of utterers each having a possibility of uttering, wherein
    the hardware processor identifies the utterer of the at least one utterance by obtaining a correspondence between the plurality of voice receivers and the plurality of utterers.

5. The conversation support system according to claim 3, wherein the hardware processor identifies the utterer of the at least one utterance by comparing a voice waveform of the utterance received by the voice receiver with each of voice waveforms unique to respective utterers each having a possibility of uttering.

6. The conversation support system according to claim 1, wherein the voice receiver is portable.

7. The conversation support system according to claim 1, wherein the hardware processor converts the voice data into text data.

8. The conversation support system according to claim 7, wherein the hardware processor punctuates and converts the voice data talk by talk into the text data.

9. The conversation support system according to claim 8, wherein the hardware processor punctuates the voice data talk by talk in response to detecting a silent state or detecting a context.

10. The conversation support system according to claim 1, wherein
    a plurality of performers each having a possibility of marking are present, and
    the marking motion catcher includes a plurality of marking motion catchers.

11. The conversation support system according to claim 1, wherein
    the marking motion catcher includes a plurality of marking motion catchers respectively provided for a plurality of performers each having a possibility of marking, and
    the marking motion is obtained in association with a performer of the marking motion.

12. The conversation support system according to claim 1, wherein
    the marking motion is performed by voice, and
    the marking motion catcher is the voice receiver that receives a voice as the marking motion.

13. The conversation support system according to claim 1, wherein
    the marking motion is performed by gesture, and
    the marking motion catcher is an imager that images a gesture as the marking motion.

14. The conversation support system according to claim 1, wherein
the voice data is converted into text data of a character string, and the character string is displayed on a display in a form of a list,
the marking motion is performed by selecting the character string corresponding to the linked utterance from the list displayed on the display, and
the marking motion catcher catches the marking motion performed on the display.

15. The conversation support system according to claim 1, further comprising a terminal device including an operation button, wherein
the marking motion is an input operation on the operation button.

16. The conversation support system according to claim 1, further comprising an operation device including an operation button with which the marking motion is performed.

17. The conversation support system according to claim 1, further comprising a display where text data of the linked utterance and the marker given to the linked utterance are displayed, wherein
the hardware processor links a note written on the display with the linked utterance and the marking motion on the same timeline.

18. The conversation support system according to claim 1, further comprising a display where text data of the linked utterance and the marker given to the linked utterance are displayed, wherein
the hardware processor links image data of an image taken at the utterance place with the linked utterance and the marking motion on the same timeline.

19. The conversation support system according to claim 1, wherein as the marking motion, multiple types of marking motions are prepared for, on the voice timeline, a position of the linked utterance to which the marker is given.

20. The conversation support system according to claim 19, wherein the multiple types of marking motions include a first marking motion by which the marker is given at an uttered timing of the linked utterance and a second marking motion by which the marker is given to the linked utterance made at a predetermined timing before a performed timing of the second marking motion.

21. The conversation support system according to claim 19, wherein
the marking motion is performed by operating an operation button, and
the position, on the voice timeline, of the linked utterance to which the marker is given is selected based on at least one of: a number of times the operation button has been operated; a length of time for which the operation button has been operated; and a strength of the operation applied to the operation button.

22. The conversation support system according to claim 1, wherein the hardware processor links identification information identifying a performer of the marking motion with the marking motion.

23. The conversation support system according to claim 22, further comprising a display where text data of the linked utterance and the marker given to the linked utterance are displayed, wherein
on the display, display is performed based on the identification information identifying the performer of the marking motion by which the marker has been given.

24. The conversation support system according to claim 22, wherein the identification information includes at least one of a name of the performer and a color set for the performer.

25. The conversation support system according to claim 1, further comprising a server that stores the voice data, information on the marking motion, information on the voice timeline, and information on the marking timeline.

26. The conversation support system according to claim 1, wherein
the hardware processor, after the marking motion is caught and managed on the marking timeline, automatically links the marking motion with the linked utterance based on a time at which the marking motion is given and a time of the linked utterance.

27. A conversation support method used at an utterance place where utterance is delivered to a plurality of persons each being an utterer having a possibility of uttering and/or a performer having a possibility of marking, comprising:
obtaining voice data of a conversation including at least one utterance made by one or more utterer and received by a voice receiver during the conversation;
managing the voice data on a voice timeline;
catching a marking motion by which a marker is given during the step of obtaining the voice data of the conversation;
managing the marking motion on a marking timeline; and
linking the marking motion with a linked utterance of the at least one utterance on a same timeline,
wherein the marking motion catcher catches the marking motion before determining the linked utterance to which the marking motion is linked.

28. A non-transitory computer readable storage medium storing a program that causes a computer of a conversation support system provided at an utterance place where utterance is delivered to a plurality of persons each being an utterer having a possibility of uttering and/or a performer having a possibility of marking to:
obtain voice data of a conversation including at least one utterance made by one or more utterer and received by a voice receiver during the conversation;
manage the voice data on a voice timeline;
catch a marking motion by which a marker is given while the voice data of the conversation continues to be obtained;
manage the marking motion on a marking timeline; and
link the marking motion with a linked utterance of the at least one utterance on a same timeline,
wherein the marking motion catcher catches the marking motion before determining the linked utterance to which the marking motion is linked.

* * * * *